(12) United States Patent
Tanno et al.

(10) Patent No.: US 11,960,308 B2
(45) Date of Patent: Apr. 16, 2024

(54) FLUID CONTROL APPARATUS, FLUID CONTROL DEVICE, AND OPERATION ANALYSIS SYSTEM

(71) Applicant: Fujikin Incorporated, Osaka (JP)

(72) Inventors: Ryutaro Tanno, Osaka (JP); Tsutomu Shinohara, Osaka (JP); Yuya Suzuki, Osaka (JP); Hidenori Kiso, Osaka (JP)

(73) Assignee: Fujikin, Incorporated, Osaka (JP)

( * ) Notice: Subject to any disclaimer, the term of this patent is extended or adjusted under 35 U.S.C. 154(b) by 217 days.

(21) Appl. No.: 17/265,180

(22) PCT Filed: Jul. 16, 2019

(86) PCT No.: PCT/JP2019/027963
§ 371 (c)(1),
(2) Date: Feb. 1, 2021

(87) PCT Pub. No.: WO2020/031629
PCT Pub. Date: Feb. 13, 2020

(65) Prior Publication Data
US 2021/0303008 A1 Sep. 30, 2021

(30) Foreign Application Priority Data
Aug. 10, 2018 (JP) .................................. 2018-151588

(51) Int. Cl.
*G05D 7/06* (2006.01)
*F16K 37/00* (2006.01)
(Continued)

(52) U.S. Cl.
CPC ....... *G05D 7/0623* (2013.01); *F16K 37/0041* (2013.01); *G05B 19/042* (2013.01);
(Continued)

(58) Field of Classification Search
CPC .. G05D 7/0682; G05D 7/0126; G05D 7/0623; F16K 21/185; F16K 37/0041;
(Continued)

(56) References Cited

U.S. PATENT DOCUMENTS 4,838,310 A * 6/1989 Scott ...................... A01G 25/16
239/69
6,810,308 B2 * 10/2004 Shajii ....................... G01F 5/00
700/282

(Continued)

FOREIGN PATENT DOCUMENTS

CN 101191482 A 6/2008
JP 11-093916 4/1999
(Continued)

*Primary Examiner* — William M McCalister
(74) *Attorney, Agent, or Firm* — WC&F IP

(57) ABSTRACT

An entire fluid supply line or an entire fluid controller constituted by a plurality of fluid control devices is precisely monitored.
A fluid controller G accumulating and having a plurality of fluid control devices A. The fluid control devices A include an operation information acquisition mechanism acquiring an operation information in the fluid control devices, an identification information storage 71 storing a self-identification information, and a communication processing unit 72 transmitting the operation information acquired by the operation information acquisition mechanism to an external terminal with the self-identification information stored in the identification information storage 71 at different timings for each of the fluid control devices A.

9 Claims, 9 Drawing Sheets

(51) Int. Cl.
*G05B 19/042* (2006.01)
*G05B 23/02* (2006.01)
*G05D 7/01* (2006.01)
*F16K 7/16* (2006.01)
*F16K 21/18* (2006.01)
*F16K 31/122* (2006.01)

(52) U.S. Cl.
CPC ......... *G05B 23/02* (2013.01); *G05B 23/0208* (2013.01); *G05D 7/0126* (2013.01); *G05D 7/0682* (2013.01); *F16K 7/16* (2013.01); *F16K 21/185* (2013.01); *F16K 31/1221* (2013.01); *F16K 37/0033* (2013.01)

(58) Field of Classification Search
CPC ... G05B 23/0208; G05B 23/02; G05B 19/042
See application file for complete search history.

(56) References Cited

U.S. PATENT DOCUMENTS

| | | | |
|---|---|---|---|
| 6,997,642 B2* | 2/2006 | Bishop, Jr. | A01B 45/02 47/1.01 R |
| 7,920,983 B1* | 4/2011 | Peleg | G06Q 10/06 702/50 |
| 8,219,253 B2* | 7/2012 | Arbter | F15B 13/0817 700/282 |
| 8,834,631 B2 | 9/2014 | Hirose et al. | |
| 9,934,671 B1* | 4/2018 | Anderson | F16K 37/0041 |
| 10,323,771 B2 | 6/2019 | Kunita et al. | |
| 2006/0000509 A1 | 1/2006 | Pozniak | |
| 2006/0054214 A1* | 3/2006 | Caamano | A01G 25/167 137/78.3 |
| 2006/0058898 A1* | 3/2006 | Emigholz | G05B 23/0243 700/47 |
| 2008/0138214 A1 | 6/2008 | Yajima | |
| 2008/0156121 A1* | 7/2008 | Radomsky | F16K 37/0083 137/554 |
| 2012/0083928 A1 | 4/2012 | Toppari et al. | |
| 2013/0183443 A1 | 7/2013 | Hirose et al. | |
| 2013/0299000 A1* | 11/2013 | Gillette, II | B67D 3/0003 137/2 |
| 2014/0144530 A1* | 5/2014 | Miller | F15B 21/08 137/551 |
| 2014/0182692 A1 | 7/2014 | Hirata et al. | |
| 2014/0230911 A1 | 8/2014 | Hirata et al. | |
| 2014/0250153 A1* | 9/2014 | Nixon | G06F 16/22 707/812 |
| 2014/0261714 A1* | 9/2014 | Burt | G05D 23/1919 137/79 |
| 2016/0370808 A1 | 12/2016 | Hirata et al. | |
| 2017/0102095 A1 | 4/2017 | Kunita et al. | |
| 2017/0234455 A1 | 8/2017 | Hirata et al. | |
| 2019/0041842 A1* | 2/2019 | Cella | G05B 19/41875 |
| 2019/0316703 A1 | 10/2019 | Dohi et al. | |
| 2019/0360887 A1 | 11/2019 | Harada et al. | |

FOREIGN PATENT DOCUMENTS

| | | |
|---|---|---|
| JP | 2002-082712 A | 3/2002 |
| JP | 2006-59322 A | 3/2003 |
| JP | 2005-73131 A | 3/2005 |
| JP | 2006-277306 A | 10/2006 |
| JP | 2012-528364 A | 11/2012 |
| JP | 2013-168131 | 8/2013 |
| JP | 2014-174558 A | 9/2014 |
| JP | 6022908 | 11/2016 |
| JP | 2016-223533 A | 12/2016 |
| JP | 2017-72216 | 4/2017 |
| JP | 6775288 | 10/2020 |
| TW | 201346981 | 11/2013 |
| TW | 201346981 A | 11/2013 |
| TW | 201713889 | 4/2017 |
| TW | 201818176 | 6/2018 |
| WO | WO2012/153454 A1 | 11/2012 |
| WO | 2018079586 | 5/2018 |
| WO | WO2018/150949 A1 | 8/2018 |

* cited by examiner (a)

(b)

FLUID CONTROL APPARATUS, FLUID CONTROL DEVICE, AND OPERATION ANALYSIS SYSTEM

CROSS-REFERENCE

This application is a national phase of an international application, PCT/JP2019/027963 filed on Jul. 16, 2019, which claims the benefit of Japanese Application No. 2018-151588, filed on Aug. 10, 2018.

TECHNICAL FIELD

The present invention relates to a technique for precisely monitoring an entire fluid supply line having a plurality of fluid control devices.

BACKGROUND ART

Fluid control devices such as an automatic valve are used in a fluid supply line that supplies a process fluid used in a semiconductor manufacturing process.

In recent years, with the advancement of semiconductor manufacturing processes such as atomic layer deposition (ALD), there has been more demand than ever for a fluid supply line capable of finely controlling a process fluid. In order to meet the demand for advanced semiconductor manufacturing processes, for example, fluid control devices that can monitor the state of valves more precisely have been proposed.

In this regard, Patent Literature 1 proposes a valve that includes a body in which a first flow passage and a second flow passage are formed; and a valve element that allows or disallows communication between the first flow passage and the second flow passage. The body has: a base part that has a first surface located on the valve element side and a second surface located on the side opposite to the first surface; a first coupling part that has a third surface forming a step from the second surface; and a second coupling part that has a fourth surface forming a step from the first surface. The first flow passage has a first-first flow passage and a first-second flow passage. The first-first flow passage has a first-first port opened to the third surface. The first-second flow passage has a first-third port communicating with a first-second port of the first-first flow passage and opened to the valve element. The first-second flow passage has a first-fourth port opened to the fourth surface. The first flow passage and the second flow passage are capable of communication with each other via the first-third port. The first coupling part is coupled to a part of a body of another valve corresponding to the second coupling part. The first-first flow passage communicates with a flow passage of a body of another valve corresponding to the first-second flow passage different from the first-first flow passage.

CITATION LIST

Patent Literature

Patent Literature 1: JP 2016-223533 A

SUMMARY OF INVENTION

Technical Problem

However, in a fluid supply line constituted by a plurality of fluid control devices, each fluid control device is affected by opening and closing operations of other fluid control devices, changes in flow rate, and the like. Accordingly, the demand for recent advanced semiconductor manufacturing processes cannot be satisfied by singly controlling or monitoring each fluid control device.

Accordingly, an object of the present invention is to precisely monitor the entire fluid supply line constituted by a plurality of fluid control devices.

Solution to Problem

In order to achieve the above objects, a fluid controller according to one aspect of the present invention is the fluid controller accumulating a plurality of fluid control devices, the fluid controller having the fluid control devices. The fluid control devices include an operation information acquisition mechanism acquiring an operation information in the fluid control devices, an identification information storage means storing a self-identification information, and a communication processing means transmitting the operation information to an external terminal with the self-identification information at different timings for each of the fluid control devices.

Further, the fluid control devices may include a discrimination processing means discriminating abnormalities of the fluid control devices based on the operation information, and the communication processing means may transmit a discrimination result of the abnormalities of the fluid control devices with the self-identification information at different timings for each of the fluid control devices.

Further, the communication processing means may further transmit the operation information of the fluid control devices or a discrimination result of the abnormalities to a predetermined information processing device at a predetermined cycle.

Further, a fluid control device according to another aspect of the present invention is the fluid control device accumulating a plurality of fluid control devices to constitute a fluid controller, and the fluid control device includes an operation information acquisition mechanism acquiring an operation information in devices, an identification information storage means storing a self-identification information, and a communication processing means transmitting the operation information to an external terminal with the self-identification information at different timings for each of the fluid control devices.

Further, an operation analysis system according to another aspect of the present invention is the operation analysis system analyzing operations for each fluid supply line constituted by a plurality of fluid control devices or for each fluid controller constituted by a plurality of fluid supply lines. The operation analysis system includes a device information storage storing a self-identification information of the fluid control devices constituting a same fluid supply line or a same fluid controller in association with each other, an operation information acquisition means acquiring an operation information with the self-identification information from the fluid control devices, and an analysis processing means referring to the associated information storage means based on the self-identification information, identifying the fluid control devices to constitute the same fluid supply line or the same fluid controller, analyzing operations or status of the each of the fluid control devices from the operations of an entire fluid supply line or an entire fluid controller based on the operation information of the fluid control devices constituting the same fluid supply line or the same fluid controller.

Advantageous Effects of Invention

According to the present invention, it is possible to precisely monitor the entire fluid supply line constituted by a plurality of fluid control devices.

PREFERRED EMBODIMENT

A fluid controller and an operation analysis system according to an embodiment of the present invention will be described below.

Figure 1:
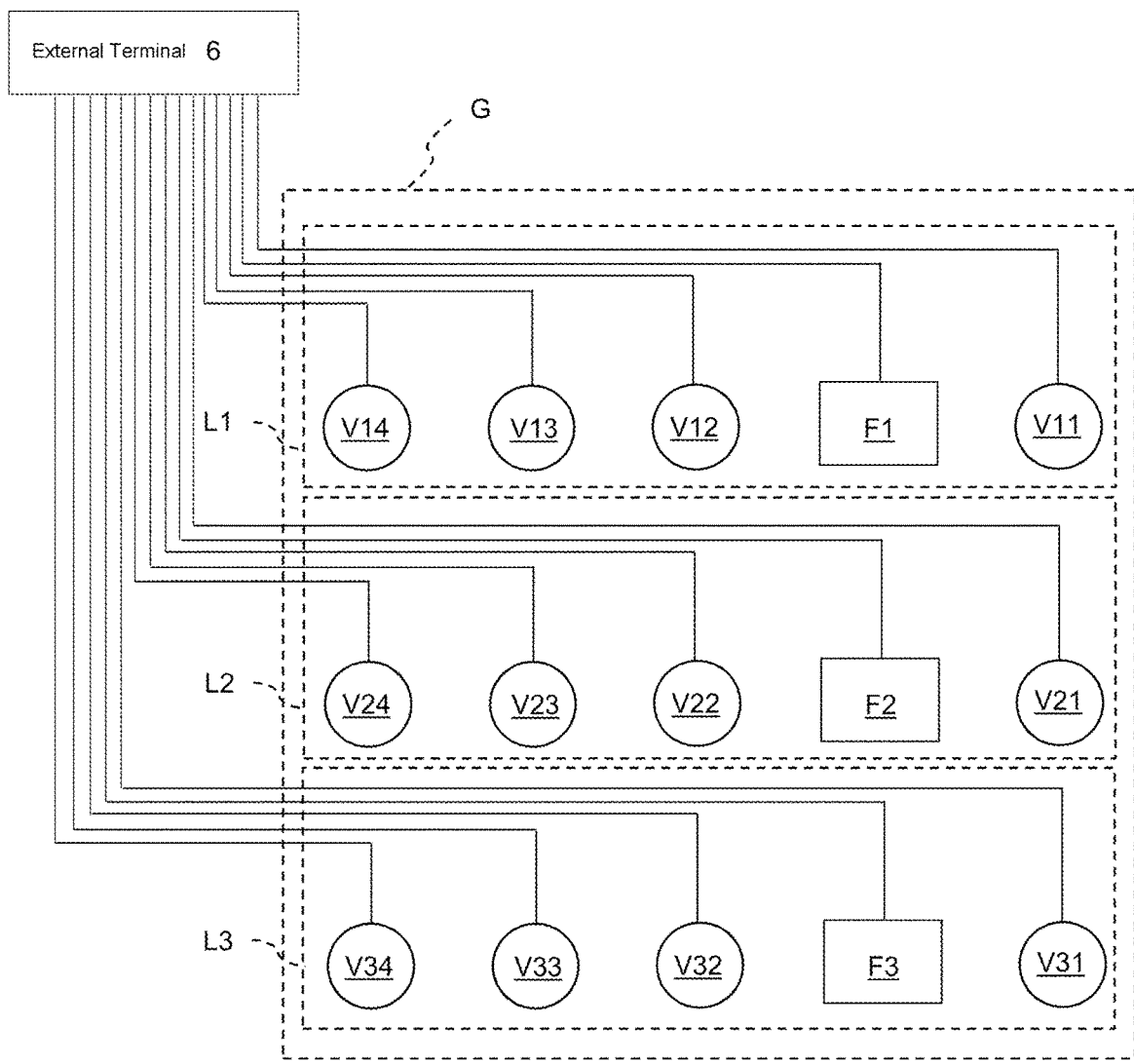
FIG. 1 is a schematic diagram illustrating connections of a fluid controller according to the present embodiment.

As illustrated in FIG. 1, a fluid controller G includes three fluid supply lines L1, L2, and L3, according to the present embodiment.

Each of the "fluid supply lines (L1, L2, and L3)" here is one of constituent units of the fluid controller (G), also referred to as a gas unit, and is formed from a route through which a process fluid flows and a group of fluid control devices disposed on the route. In addition, the fluid supply line is a minimum constituent unit that can control a process fluid and independently process an object to be processed. The fluid controller is usually configured by arranging the plurality of fluid supply lines in parallel.

In addition, terms "outside" or "outside the line" appearing in the following description refers to parts or mechanisms that do not constitute the fluid controller or the fluid supply lines. The mechanisms outside or outside the line include a power supply source that supplies electric power necessary for driving the fluid controller, a driving pressure supply source that supplies a driving pressure, and a device and a terminal which is able to communicate with the fluid controller.

Each of the fluid supply lines L1, L2, and L3 is a fluid-tight communication of a plurality of fluid control devices. The fluid control devices include valves (V11 to V14, V21 to V24, and V31 to V34) and flow rate controllers (F1 to F3). In the following description, the valves (V11 to V14, V21 to V24, and V31 to V34) may be collectively referenced as a valve V, and the flow rate controllers (F1 to F3) may be collectively referenced as a flow rate controller F. The valve V and the flow rate controller F may be considered as a device for controlling fluids in a superordinate concept and collectively referred as a fluid control device A.

Valve V

Valves V are valves used in a gas line of the fluid controller G such as diaphragm valves, and a plurality of valves are integrated to form the fluid controller G with other fluid control device A.

The valves V are provided with a pressure sensor P (described later in FIG. 3 and the like), a magnetic sensor and the like, at predetermined places as an operation information acquisition mechanism acquiring an operation information of the valves V, and data detected by the sensors can be sent to an external terminal 6 connected to the valves V.

Figure 2:
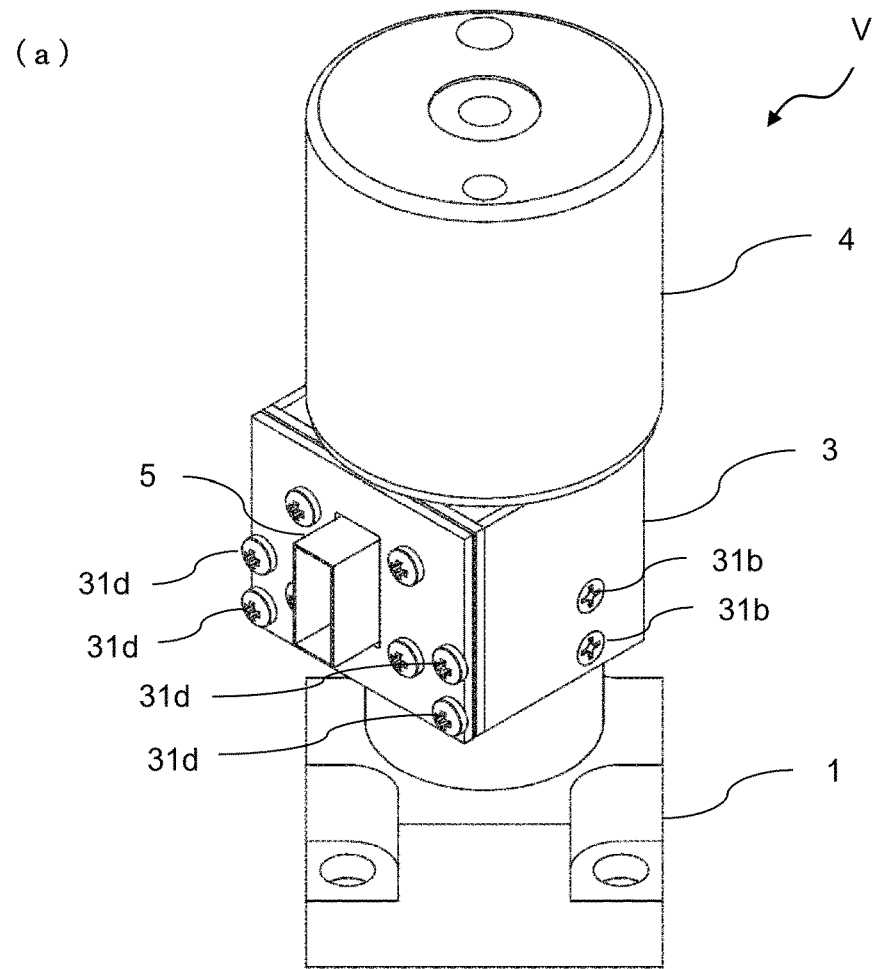
FIG. 2(a) is a diagram illustrating an external perspective view and FIG. 2(b) is a diagram illustrating a plan view of a fluid control device constituting a fluid controller according to the present embodiment.
Figure 2:
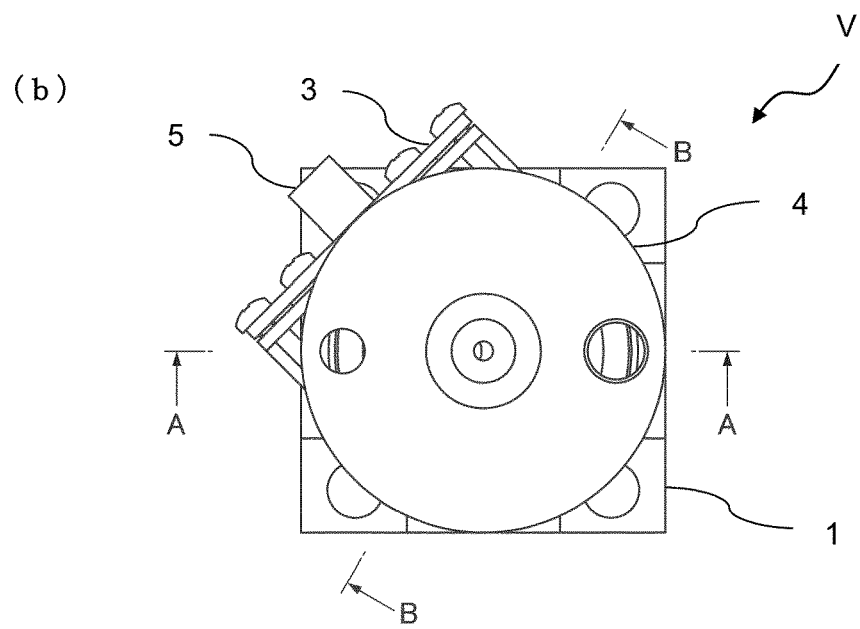

An example of such valves is shown in FIG. 2. The valve V is an air-operated direct diaphragm valve, as illustrated in FIG. 3 to FIG. 5, and includes a valve body 1, a bonnet part 2, a cover part 3, and an actuator part 4.

Figure 3:
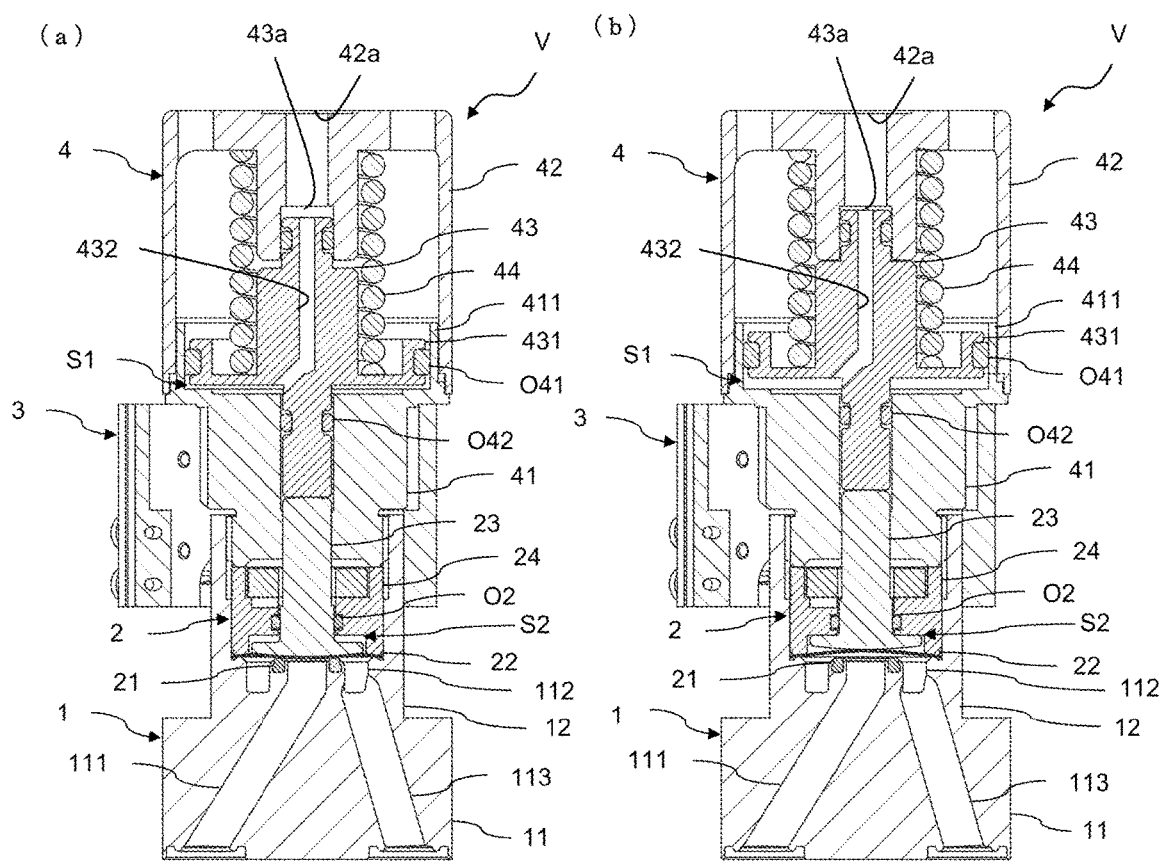
FIG. 3 is a diagram illustrating a cross-sectional view taken along line A-A of an internal structure of the fluid control device constituting a fluid controller according to the present embodiment, and (a) is illustrating a closing valve state and (b) is illustrating an opening valve state.
Figure 4:
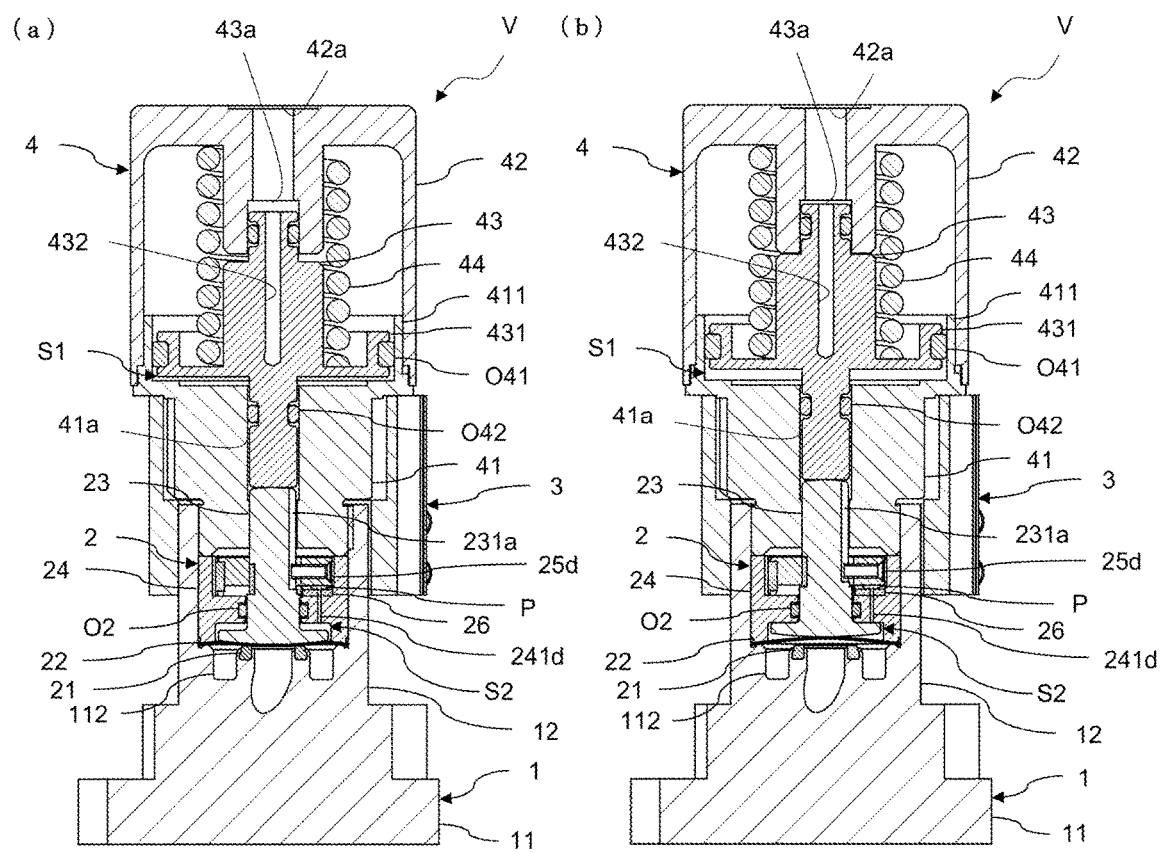
FIG. 4 is a diagram illustrating a cross-sectional view taken along line B-B of an internal structure of the fluid control device constituting a fluid controller according to the present embodiment, and (a) is illustrating a closing valve state and (b) is illustrating an opening valve state.
Figure 5:
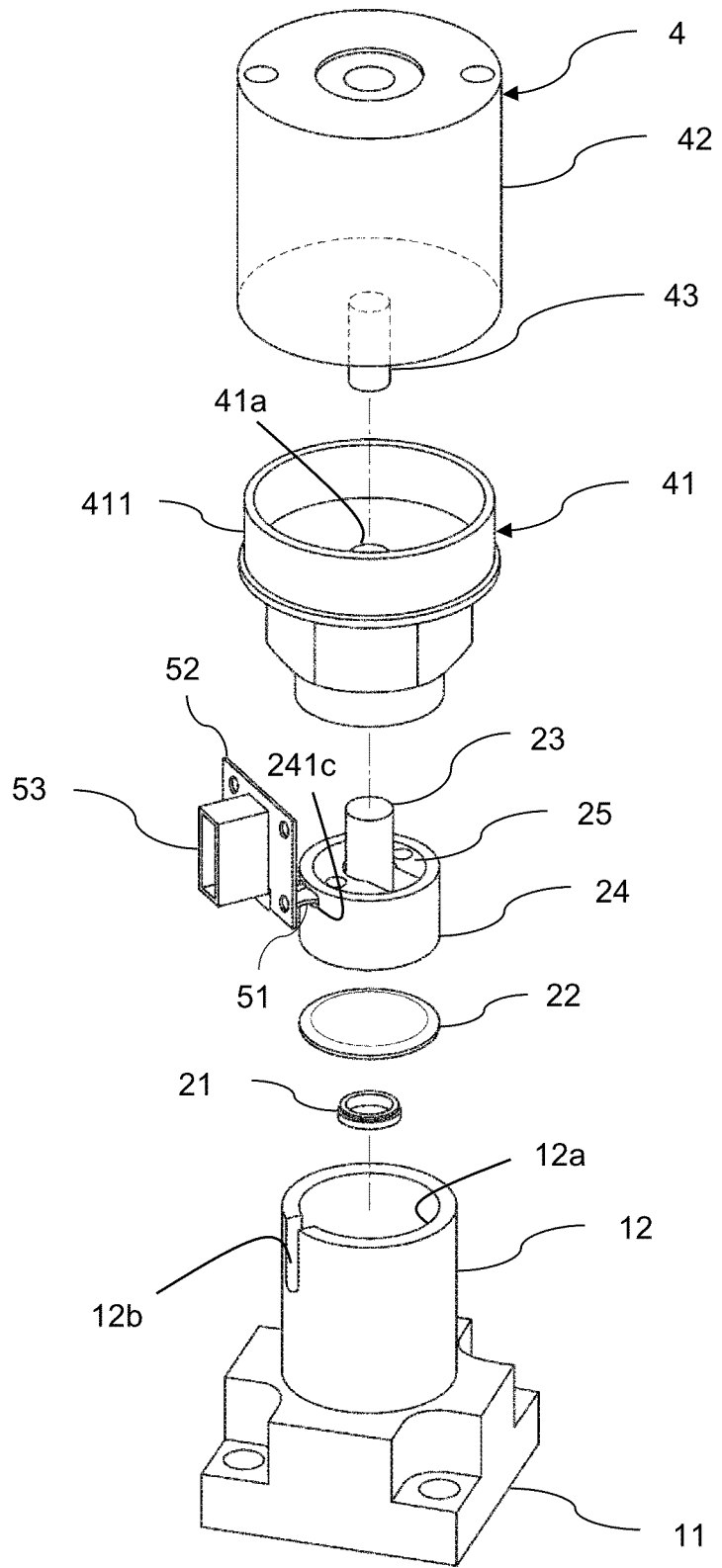
FIG. 5 is a diagram illustrating an exploded perspective view of a fluid control device constituting a fluid controller according to the present embodiment.
Figure 6:
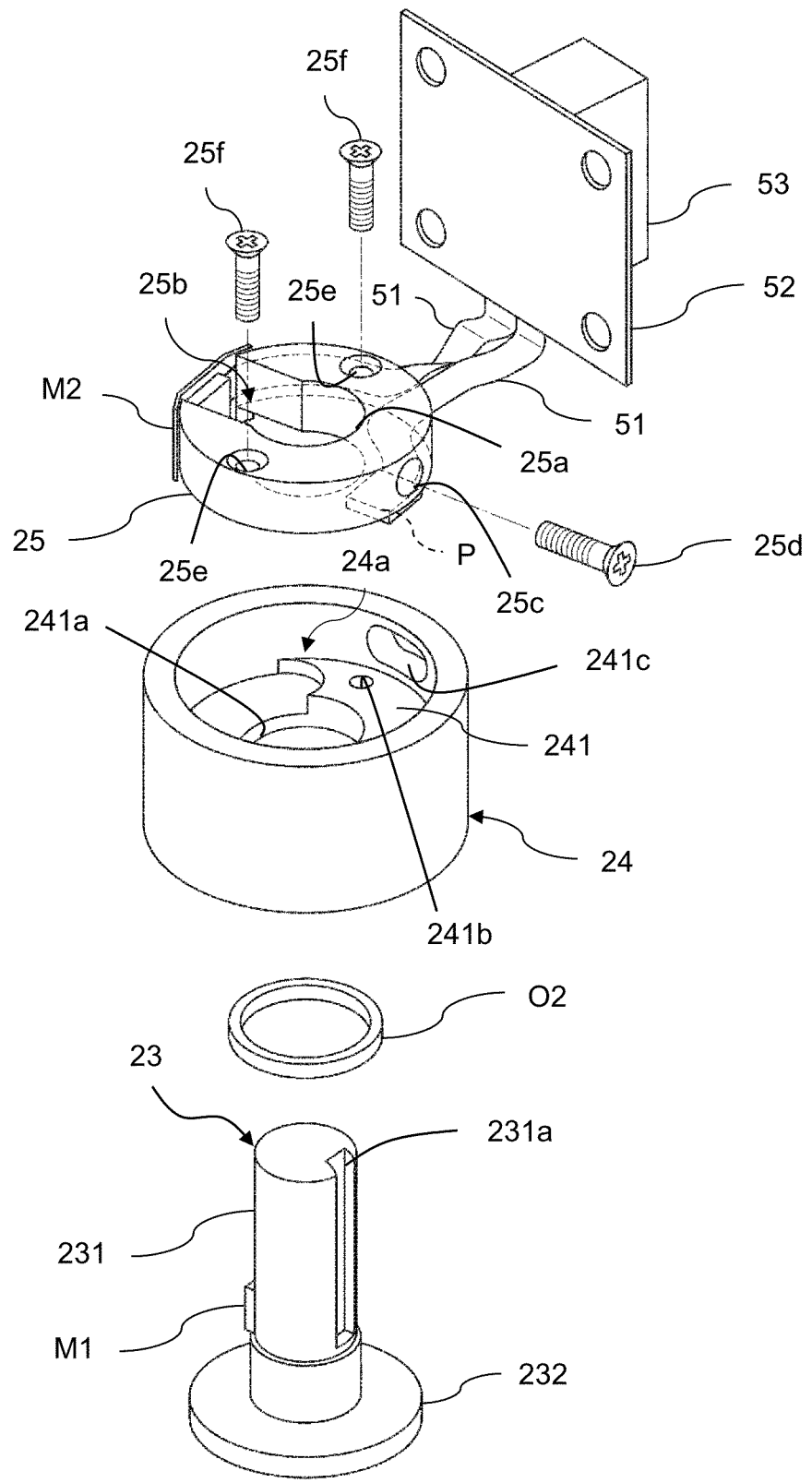
FIG. 6 is a diagram illustrating an exploded perspective view of a fluid control device constituting a fluid controller according to the present embodiment.

The valve body 1, as illustrated in FIG. 3 to FIG. 5, includes a base 11 where a flow path is formed and a cylindrical part 12 of substantially cylindrical shape provided on the base 11.

The base 11 is a rectangular shape in a plan view and becomes a part located on a substrate or a manifold block when it configures the fluid controller G unitized by a plurality of valves V.

The cylindrical part 12 is a hollow shape with an open end face on a side where the bonnet part 2 is arranged, and inside of the hollow constitutes a recess 12a storing the bonnet part 2.

This cylindrical part 12 has a slit 12b, which has a length in an axial direction, which opens on one side opposite to the base 11 and at a side where the bonnet part 2 is placed, and which is penetrated to a side of the recess 12a from the outside. A flexible cable 51 extending from a bonnet wall 25 through this slit 12b is led out from the inside to the outside.

Below the recess 12a and the inside of the base 11, an inflow path 111 where a fluid flows in, an outflow path 113 where the fluid flows out, and a valve chamber 112 connecting with the inflow path 111 and the outflow path 113, are formed. The inflow path 111, the outflow path 113, and the valve chamber 112 integrally constitute a flow path where the fluid flows.

The bonnet part 2, as illustrated in FIGS. 3 to 6, is placed in a state of being stored in the inside of the recess 12a of the valve body 1.

This bonnet part 2 includes a seat 21, a diaphragm 22, a diaphragm retainer 23, a bonnet 24, and the bonnet wall 25.

The annular seat 21 is provided on an open periphery of an inflow path 111 in a valve chamber 112. By making the seat 21 brought into contact with and detached from the diaphragm 22, the fluid can flow from the inflow path 111 to the outflow path 113, or the flow can be blocked.

The diaphragm 22 is made of metal such as stainless steel or a NiCo-based alloy, is a spherical shell-shaped member with a convex central part, and separates the flow path from a space where the actuator part 4 operates. When the diaphragm 22 is not pressed by the diaphragm retainer 23, the diaphragm 22 is detached from the seat 21 as illustrated in FIG. 3(b) and FIG. 4(b), and the inflow path 111 and the outflow path 113 are in a connected state. On the other hand, in a state of being pressed by the diaphragm retainer 23, as illustrated in FIG. 3(a) and FIG. 4(a), a central part of the diaphragm 22 is deformed and brought into contact with the seat 21, and the inflow path 111 and the outflow path 113 are blocked.

The diaphragm retainer 23 is provided on an upper side of the diaphragm 22 and presses the central part of the diaphragm 22 in conjunction with a vertical move of a piston 43.

This diaphragm retainer 23 includes a substantially cylindrical base body 231 and an increased diameter portion 232, where a diameter is increased at one end side that is brought into contact with the diaphragm 22.

A groove 231a, having a length in an axial direction and one end open on a side opposite to the increased diameter portion 232, with a bottom is formed on the base body 231. A shank part of a screw 25d, screwed into a screw hole 25c of the bonnet wall 25, fits slidably within this groove 231a. The groove 231a and the screw 25d constitute a rotation regulator regulating circumferential rotation of the diaphragm retainer 23. As a result, the diaphragm retainer 23 is regulated the circumferential rotation while vertically moving in conjunction with the piston 43.

A magnet M1 constituting a magnetic sensor is installed in the base body 231. This magnet M1 constitutes the magnetic sensor, described later, with a magnetic body M2, installed on the bonnet wall 25. In this embodiment, the magnet M1 is installed on an opposite side of the groove 231a of the base body 231, but it is also possible to install on other positions of the base body 231 as long as there is no problem in constituting the magnetic body M2 and the magnetic sensor.

The bonnet 24 is substantially cylindrical, and is stored in the recess 12a of the valve body 1.

The diaphragm 22 is supported between a lower end of the bonnet 24 and the valve body 1, and this part forms a seal between the diaphragm 22 and the valve body 1.

A substantially disk-shaped partition 241, where a penetration hole 241a is formed in a center and the diaphragm retainer 23 is penetrated to the penetration hole 241a, is provided inside of the bonnet 24.

The bonnet wall 25 is stored in a recess 24a, formed above the partition 241 or on a side where the actuator part 4 is arranged. Screw holes 241b and through holes 25e are provided in each of the partition 241 and the bonnet wall 25 at positions corresponding to each other, and the bonnet wall 25 is screwed to the bonnet 24 by a bolt 25f.

The partition 241 of the bonnet 24 has a certain thickness, and O-ring O2 is interposed between an inner peripheral surface of the penetration hole 241a formed in the partition 241 and the diaphragm retainer 23. As a result, an airtightness of a space defined by the partition 241 and the diaphragm 22 is ensured.

Further, a connection hole 241d, connected to a pressure sensor P installed in the bonnet wall 25, is provided in the partition 241 of the bonnet 24. Since the pressure sensor P is provided through the connection hole 241d, a pressure inside of a closed space S2 defined by the partition 241, the diaphragm 22, and the diaphragm retainer 23, is possible to be measured.

Furthermore, on a side of the bonnet 24, a through hole 241c is provided for leading the flexible cable 51, leading from the bonnet wall 25 stored inside, to the outside.

The bonnet wall 25 is a member arranged in the bonnet 24. This bonnet wall 25 has a shape that is a thick substantially disk-shaped member hollowed out in a C-shape in a plan view. In a center of the bonnet wall 25, a penetration hole 25a is provided to penetrate the base body 231 of the diaphragm retainer 23. In addition, an opening 25b is provided to open the penetration hole 25a to an outward in a radial direction of the bonnet wall 25.

The screw hole 25c, threaded outward in a radial direction from the penetration hole 25a, is formed at a predetermined location of a thick part of the bonnet wall 25. The screw 25d is screwed into this screw hole 25c from the outside, and an axial part of the screwed screw 25d comes out to the penetration hole 25a and slidably fits to the groove 231a of the diaphragm retainer 23 penetrated to the penetration hole 25a.

The through hole 25e is provided in the bonnet wall 25 at a position corresponding to the screw hole 241b of the bonnet 24. The bolt 25f is screwed into the screw hole 241b and the through hole 25e with the bonnet wall 25 arranged on the partition 241 of the bonnet 24, whereby the bonnet wall 25 is fixed to the bonnet 24.

The flat plate-shaped magnetic body M2, fixed to lay and close the opening 25b, is installed close to the opening 25b of an outer peripheral surface of the bonnet wall 25. This magnetic body M2 constitutes the magnetic sensor described later with the magnet M1 installed in the diaphragm retainer 23.

Figure 7:
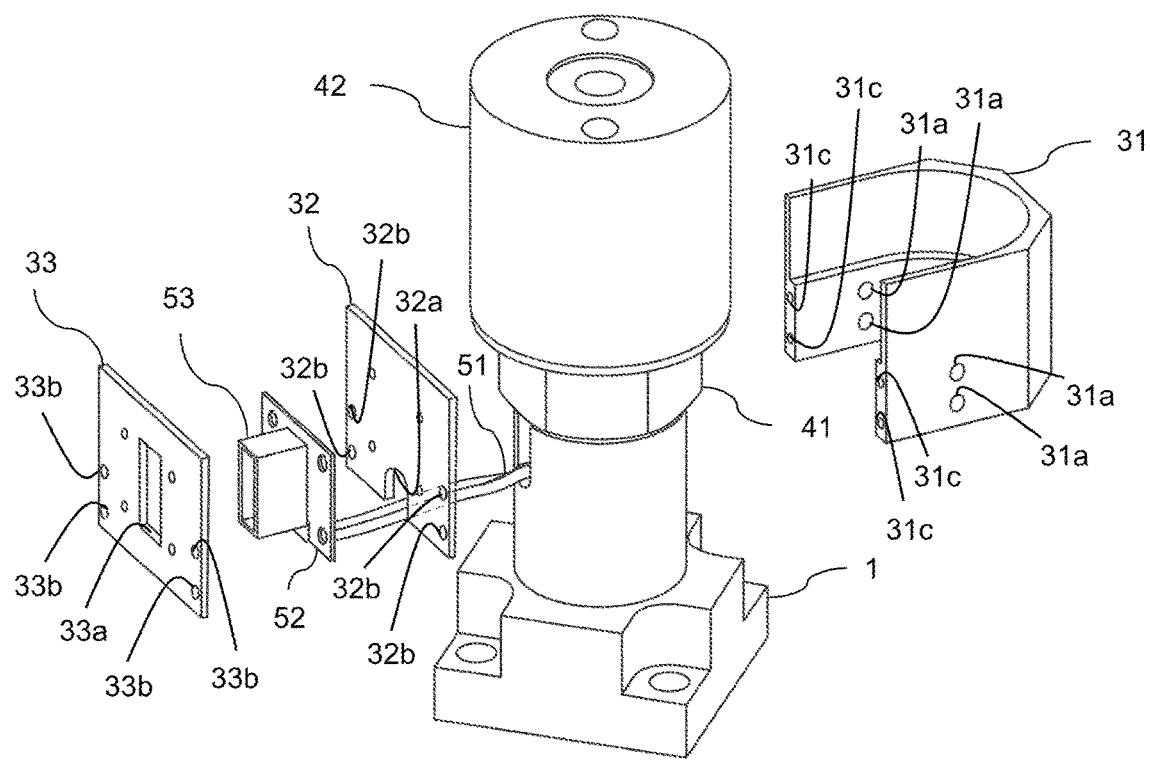
FIG. 7 is a diagram illustrating an exploded perspective view of a fluid control device constituting a fluid controller according to the present embodiment.

The cover part 3, as illustrated in FIG. 2 and FIG. 7, compresses and integrally holds an actuator body 41 and the valve body 1, and constitutes a fastener fastening a circuit board 52 and a connector 53, provided in the circuit board 52, to the valve V.

This cover part 3 includes a cover 31 and flat plates 32 and 33.

The cover 31 is a substantially U-shaped, and the actuator body 41 and an end part of the valve body 1 is fitted inside of the cover 31.

Screw holes 31a are provided on both sides of the cover 31 corresponding to positions where the actuator body 41 is fitted. As a result, when the screw 31b is screwed into the screw hole 31a with the valve body 1 fitted inside and a tip of the screw 31b is pressed against the valve body 1, the inside of the cover 31 is able to support the valve body 1 from both sides thereof.

Furthermore, the screw holes 31c are provided in a thick part of the cover 31. The plates 32 and 33 are installed to the cover 31 by screwing the screws 31d into the screw holes 31c via the through holes 32b and 33b of the plates 32 and 33.

The plates 32 and 33 are screwed and fixed to the cover 31 while the actuator body 41 and the end part of the valve body 1 are fitted inside of the cover 31, and compresses and holds the actuator body 41 and the valve body 1 between the cover 31 in the fixed state. A notch 32a cut out a tongue-shape is formed below the plate 32, and the flexible cable 51 is led via this notch 32a to the circuit board 52, where the connector 53 is provided.

The plate 33 is screwed and fixed to the plate 32 and the cover 31 while the circuit box 52 is interposed between the plate 32 and 33, and compresses and holds the circuit board 52 between the plate 32 and 33. The plate 33 is provided with a substantially rectangular shaped through hole 33a in a central part, and the connector 53 provided in the circuit board 52 is led to the outside from this through hole 33a.

The base 11 is in a rectangular shape in a plan view, and the cover part 3, as illustrated in FIG. 2(b), fixes the connector 53 to the valve V in a diagonal direction of the rectangular base 11. The reason for fixing the connector 53 in this direction is as follows. When constituting the fluid controller G unitized by a plurality of the valves V, it is preferable to align a direction of adjacent rectangular base 11 to eliminate intervals as much as possible, and it is preferable to arrange the valves V on a substrate or a manifold block due to a demand for integration. On the other hand, when they are arranged and integrated in this way, it becomes difficult to connect terminals or the like to the connector 53. Thus, by directing the connector 53 in the diagonal direction of the base 11, it is possible to take a wider space for connection compared to point to the valves V, located right next to it. As a result, it is easy to connect terminals and the like to the connector 53, it is possible to prevent problems such as disconnection due to broken or twisted terminals and the like, and it is possible to prevent problems that terminals come into contact with the valves V to cause an abnormality in an operation of the valves V.

The actuator part 4 is arranged above the bonnet part 2.

This actuator part 4, as illustrated in FIG. 3 and FIG. 4, includes the actuator body 41, an actuator cap 42, a piston 43, and a spring 44. Although the internal structure of the actuator part 4 is omitted in FIG. 5, the internal structure is illustrated in FIG. 3 and FIG. 4.

The actuator body 41 is interposed between the piston 43 and the bonnet 24.

As illustrated in FIG. 5, the actuator body 41 has a substantially cylindrical shape, and a penetration hole 41a where the piston 43 and the diaphragm retainer 23 is penetrated is provided along a length direction at a center. As illustrated in FIG. 3 and FIG. 4, the piston 43 is brought into contact with the diaphragm retainer 23 in the penetration hole 41a, and the diaphragm retainer 23 vertically moves in conjunction with a vertical move of the piston 43.

A peripheral wall 411 having an annular projection is formed on an upper end surface on a side where the piston 43 is arranged, and a driving pressure introduction chamber S1, where a driving pressure is introduced, is formed between a flat horizontal surface inside of the peripheral wall 411 and a lower end surface of the increased diameter portion 431 of the piston 43.

Further, an external thread is threaded on an outer peripheral surface of a side where the piston 43 of the actuator body 41 is arranged, and the actuator body 41 is installed to one end of the actuator cap 42 by screwing the external thread to an internal thread threaded on an inner peripheral surface of the actuator cap 42.

A center of a length direction of the actuator body 41 is formed a substantially hexagonal shape in a cross sectional view, an upper end part of the substantially hexagonal shape in a cross sectional view and the valve body 1 are integrally compressed by the cover 31.

The actuator cap 42 is a cap-shaped member, having an open lower end, and stores the piston 43 and the spring 44 inside.

An opening 42a, connecting to a driving pressure introduction path 432 of the piston 43, is provided in an upper end surface of the actuator cap 42.

A lower end of the actuator cap 42 is closed by screwing an upper part of the actuator body 41.

The piston 43 vertically moves in conjunction with supplying and stopping of the driving pressure, and the diaphragm 22 is brought into contact with and detached from the seat 21 through the diaphragm retainer 23.

A substantially center in an axial direction of the piston 43 is expanded in a disk-shape and constitutes the increased diameter portion 431. The piston 43 receives a bias of the spring 44 on an upper surface of the increased diameter portion 431. Further, the driving pressure introduction chamber S1 where the driving pressure is supplied is formed on a lower end of the increased diameter portion 431.

Furthermore, the driving pressure introduction path 432 is provided inside of the piston 43 to connect the opening 43a, formed on an upper end surface, to the driving pressure introduction chamber S1, formed on a lower end. The opening 43a of the piston 43 is connected to the opening 42a of the actuator cap 42, an introduction pipe introducing the driving pressure from the outside is connected to the opening 42a, and the driving pressure is supplied to the driving pressure introduction chamber S1 as a result.

An O-ring O41 is installed on an outer peripheral surface of the increased diameter portion 431 of the piston 43, and the O-ring O41 seals an outer peripheral surface of the increased diameter portion 431 and the peripheral wall 411 of the actuator body 41. Further, an O-ring O42 is installed on a lower end of the piston 43, and the O-ring O42 seals an outer peripheral surface of the piston 43 and an inner peripheral surface of the penetration hole 41a of the actuator body 41. The driving pressure introduction chamber S, connected to the driving pressure introduction path 432 in the piston 43 is formed by these O-rings O41 and O42, and an airtightness of this driving pressure introduction chamber S1 is ensured.

The spring 44 is wound around an outer peripheral surface of the piston 43, is brought into contact with an upper surface of the increased diameter portion 431 of the piston 43, and biases the piston 43 in a downward direction, such as a direction pushing down the diaphragm 22.

An opening/closing operation of the valve accompanying a supply and a stop of the driving pressure is mentioned. When air is supplied from the introduction pipe (not illustrated in figures) connected to the opening 42a, the air is led to the driving pressure introduction chamber S1 via the driving pressure introduction path 432 in the piston 43. In response, the piston 43 is pushed upward against the bias of the spring 44. As a result, the diaphragm 22 is detached from the seat 21, the valve is opened, and the fluid flows. On the other hand, when the air is not led to the driving pressure introduction chamber S1, the piston 43 is pushed downward in accordance with the bias of the spring 44. As a result, the diaphragm 22 comes into contact with the seat 21, the valve is closed, and the fluid is blocked.

As a result, the diaphragm 22 comes into contact with the seat 21, the valve is closed, and the fluid is blocked.

The valve V includes the pressure sensor P and the magnetic sensor, having the magnet M1 and the magnetic body M2, as a sensor for constituting the operation information acquisition mechanism to acquire the operation information in the device.

The pressure sensor P, as illustrated in FIG. 4, is installed to a lower surface of the bonnet wall 25 or a side of the flow path. The pressure sensor P is connected to the closed space S2 defined by the diaphragm 22, the partition 241, and the diaphragm retainer 23, of the bonnet 24 via the connection hole 241d. This pressure sensor P is constituted by a pressure-sensitive element, detecting a pressure change, and a conversion element and the like, converting a detected value of the pressure detected by the pressure-sensitive element to an electric signal. As a result, the pressure sensor P is possible to detect the pressure in the space defined by the diaphragm 22, the partition 241, and the diaphragm retainer 23, of the bonnet 24.

A packing 26 is interposed at a position where the pressure sensor P is connected to the connection hole 241*d* to ensure the airtightness.

The pressure sensor P may detect either a gauge pressure or an atmospheric pressure, and a threshold value referred by a discrimination processing unit 62 (described later with reference to FIG. 8) may be set according to each case.

A magnetic body M2 is installed to the opening 25*b* of the bonnet wall 25, and this magnetic body M2 constitutes the magnetic sensor with the magnet M1 installed to the diaphragm retainer 23.

With this magnetic sensor, the opening/closing operation of the valve is possible to be detected as follows. While the magnet M1 slides in response to the vertical movement of the diaphragm retainer 23, the magnetic body M2 is fixed to the inside of the valve body 1 with the bonnet wall 25 and the bonnet 24. As a result, it is possible to detect the operation of the diaphragm retainer 23 and the opening/closing operation of the valve based on changes in a magnetic field generated between the magnet M1, which is vertically moving in accordance with the vertical move of the diaphragm retainer 23, and the magnetic body M2 with a fixed position.

The magnetic sensor has a planar coil, an oscillation circuit, and an integration circuit, and the oscillation frequency changes according to a change in the distance from the magnet M1 located at the opposing position. Converting this frequency by the integration circuit and obtaining the integrated value makes it possible to measure not only the open and close states of the valves V but also the opening degree at the time of opening the valve V.

The magnetic sensor is used in this embodiment, but the present invention is not limited to this, and other types of sensors such as an optical positioning sensor may be used in other embodiments.

Each of the pressure sensor P and the magnetic sensor is connected to one end of the flexible cable 51 for communication having flexibility (the magnetic sensor is connected to the magnetic body M2 in detail), and the other end of the flexible cable 51 is connected to the circuit board 52 provided on the outside of the valve V1-.

In this embodiment, a processing module 7 (described later with reference to FIG. 8) executing a predetermined information processing is formed on the circuit board 52, and as a result, the operation information acquired from the pressure sensor P and the magnetic sensor can be transmitted to the external terminal 6 connected to the connector 53.

In the present embodiment, a flexible printed circuits (FPC) is used for the flexible cable 51 and the circuit board 52, and flexible cable 51, circuit board 52, and connector 53 are integrally configured. By using the flexible printed circuits to the flexible cable 51 and the circuit board 52, it is possible to use a space between the members as a wiring path. As a result, it is possible to reduce the size of the valve V1 itself as compared to using covered wires.

Further, the processing module 7 may be stored in the valve V1 separately from the circuit board 52, or may be configured as a part of the pressure sensor P or the magnetic sensor.

In addition, types and shapes of the connector 53 can be appropriately designed according to various standards.

Further, the operation information acquisition mechanism, accomplished by the pressure sensor P and the magnetic sensor described above, can also be accomplished by using a driving pressure sensor detecting a driving pressure, a temperature sensor measuring a temperature in the flow path, a limit switch detecting behaviors of the piston 43 or the diaphragm retainer 23, and the like.

Operation Analysis System

Subsequently, an operation analysis system of the fluid controller G according to the present embodiment will be described.

In the present embodiment, a plurality of the fluid control devices A constituting the fluid controller G has a bus type connection structure connected in parallel to the external terminal 6. The external terminal 6 aggregates the operation information supplied from the subordinate fluid control devices and monitors operations of each of the valves V and the flow rate controllers F. Further, it is possible to analyze operations and detecting abnormalities in units of each fluid supply lines L1, L2, L3 or the fluid controller G by identifying which fluid supply lines L1, L2, L3 or the fluid controller G constitute each of the fluid control devices A.

In an abnormality detection means in which each of the fluid supply lines L1, L2, L3 or the fluid controller G is used as a unit, for example, a diagnosing mode is provided separately from a normal operation, opening and closing of each of the fluid control devices A is appropriately controlled, and a pressure at a predetermined position is measured. From a measured value of this pressure, abnormalities of the fluid control devices A can be diagnosed by detecting a pressure that should not be detected if a specified fluid control device A is closed, or by not detecting a pressure that should be detected if a specified fluid control device A is opened. In addition, troubles, such as seat leaks or the like, of the fluid control devices A can be diagnosed by comparing a pressure drop characteristics at a predetermined position according to switching of opening/closing states of the fluid control devices A to a pressure drop characteristics under a normal condition.

Figure 8:
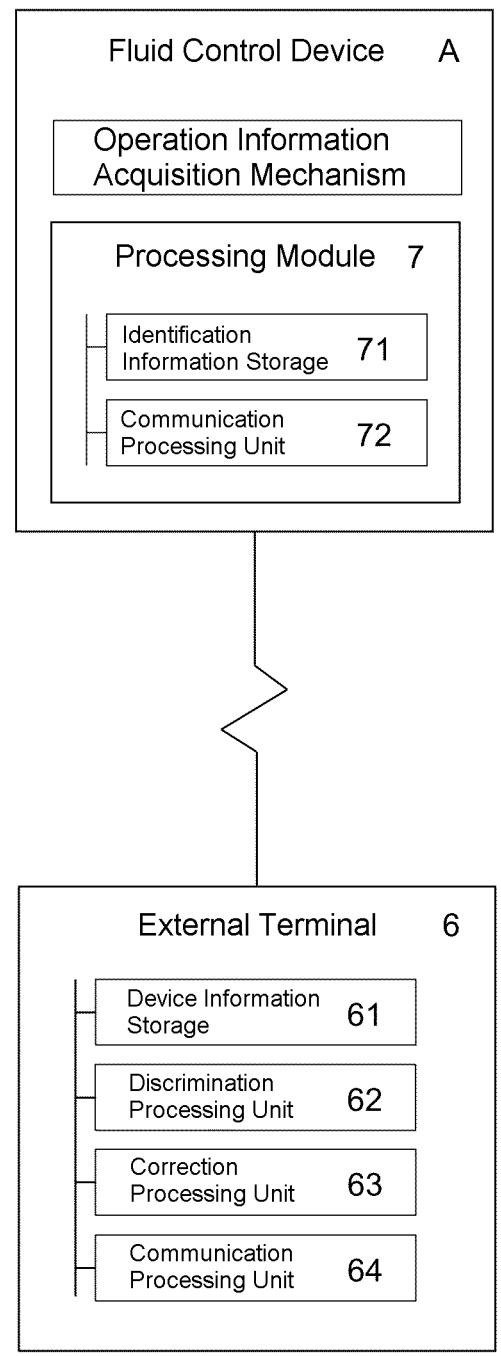
FIG. 8 is a functional block diagram illustrating functions of an external terminal and a fluid control device constituting a fluid controller according to the present embodiment.

FIG. 8 illustrates an example of a functional configuration in which the operation information of each of the fluid supply lines L1, L2, L3 are accumulated to the external terminal 6 and in which abnormalities of the fluid control devices A can be detected in the external terminal 6. Thereby, as an example of an operation analysis process, a case where an abnormality detection process is executed by the fluid control devices A and the external terminal 6 communicably connected to the fluid control devices A will be described.

In this example, a processing module 7 included in the fluid control devices A includes an identification information storage 71 and a communication processing unit 72. In a case of the valve V, the processing module 7, for example, is configured by an arithmetic circuit or a memory provided on the circuit board 52.

The identification information storage 71 is a storage storing a self-identification issued for each fluid control device A or the processing module 7.

The self-identification information is a unique information for each fluid control device A or the processing module 7, and a certain fluid control device A from a plurality of the fluid control devices A can be identified by referring this information.

The communication processing unit 72 is a functional unit for executing a process transmitting data to the external terminal 6 connected via the connector 53. In a case of the valve V, the processing module 7 is configured to be able to cooperate with the pressure sensor P and the magnetic sensor, which are the operation information acquisition mechanisms, and when the operation information of the fluid control device A is acquired from the pressure sensor P and the magnetic sensor, the communication processing unit 72 can transmit the acquired operation information to the external terminal 6 with the self-identification information.

In the valve V according to the present embodiment, the external terminal 6 transmits and receives data to or from the valve V by a wired connection via the connector 53, but it is possible to be constituted with a wireless LAN, Bluetooth (registered trademark), an infrared communication, or Zigbee (registered trademark) and the like to transmit and receive data by a wireless communication. Similarly, the flow rate controller F may be provided with either wired or wireless communication means.

Further, the communication processing unit 72 can transmit the operation information at a predetermined cycle set arbitrarily, such as one hour or one day.

In this respect, in the abnormality detection based on the operation information of the valve V, it is difficult to detect the moment of a slight leak of the fluid, but if it is several days or so, it can be detected because the pressure increases. On the other hand, since the closed space S2 is an airtight space, it is unlikely that a problem will occur immediately even if a minute leak occurs. Therefore, there is no problem even if transmission is performed according to a predetermined cycle. Furthermore, when information transmission is performed in a predetermined cycle as described above, power consumption can be suppressed.

Further, the communication processing unit 72 can transmit the self-identification information and the operation information to the external terminal at different timings for each of the fluid control devices A. Methods of transmitting at different timings for each of the fluid control devices A is not particularly limited, but for example, it can be achieved by requesting each of the fluid control devices A from the external terminal 6 to acquire the self-identification information and the operation information at a preset time interval and order. In addition, after determining a random order from random numbers generated based on a predetermined calculation formula, a predetermined fluid control device A may be requested to acquire the self-identification information and the operation information according to the order, and a next fluid control device A may be requested to acquire the self-identification information and the operation information after the self-identification information and the operation information is acquired from the predetermined fluid control device A. Furthermore, the fluid control device A itself may randomly determine a predetermined date and time from a predetermined fixed period, and transmit the self-identification information and the operation information to the external terminal 6 at the predetermined date and time.

As a result, it is possible to avoid the problem of packet collision, and it is also possible to prevent processing overload as compared with a situation where the transmission is made all at once. Furthermore, when the communication is established by wireless radio, unlike a case of simultaneous transmission, it is not necessary to change radio channels used for data transmission for each of the fluid control devices A, and therefore it is not necessary to prepare many channels. In particular, when a connecting means of the fluid control devices A and the external terminal 6 is configured by Bluetooth (registered trademark), a number of simultaneously connected devices is limited (usually seven), and therefore by changing the transmission timing, a number of the fluid control devices A can exceed the number simultaneously connected devices.

The timing of the self-identification information and the operation information can be performed for each of the fluid control devices A, for each of the fluid supply lines L1, L2, L3, and for each of the fluid controller G.

In the present embodiment, the external terminal 6 constitutes an abnormality detection device acquiring the operation information from the fluid control devices A and detecting abnormalities of the fluid control devices A based on the operation information. Specifically, in a case of valve V, the abnormality detection device, detecting abnormalities caused by fluid leaks from the flow paths to the closed space S2, is configured.

The external terminal 6 is a so-called personal computer or a server, or a portable terminal capable of transmitting, receiving, and processing data, and includes hardware resources such as a CPU, a computer program executed by the CPU, a RAM (Random Access Memory) or ROM (Read Only Memory) storing computer programs or predetermined data, and an external storage such as a hard disk drive, and as a result, functional units including a device information storage 61, a discrimination processing unit 62, a correction processing unit 63, and a communication processing unit 64, are provided.

The device information storage 61 is a storage unit storing the self-identification information of each of the fluid control devices A. In the device information storage 61, the self-identification information of each of the fluid control devices A is associated with a self-identification information of other fluid control devices A configuring the same fluid supply lines L1, L2, L3 and the fluid controller G. As a result, one of the fluid control devices A can be distinguished from the other fluid control devices A, and the fluid control devices A configuring the same fluid supply lines L1, L2, L3 and the fluid controller G as the one of the fluid control devices A can be distinguished.

The discrimination processing unit 62 determines whether there are operation abnormalities of the fluid control devices A based on the operation information provided by the fluid control devices A. Specifically, a predetermined threshold value stored in a reference table and the like is compared with the operation information. If it is the valve V, the predetermined threshold value stored in the reference table and the like is compared with the detected value of the pressure detected by the pressure sensor P to execute a process to determine abnormalities of the valve V caused by fluid leaks and the like to the closed space S2. In other words, a limit value of the pressure inside of the closed space S2 assumed by a valve opening and closing of the valve V is set as the predetermined threshold value. Then, when the detected value of the pressure inside of the closed space S2 exceeds the threshold value, it is discriminated that an abnormality has occurred in the valve V. The rationality of such discrimination is that the detected value of the pressure in the closed space S2 can be considered to exceed the threshold value as a result of the pressure inside of the closed space S2 increasing due to the fluid leaks into the closed space S2 for damages of the diaphragm 22, or the pressure inside of the closed space S2 decreasing due to the decompression in the flow path. In this embodiment, the discrimination processing unit 62 configures an analysis processing unit analyzing operations of the fluid control devices A with the correction processing unit 63.

The correction processing unit 63 corrects a predetermined threshold value that the discrimination processing unit 62 refers to for discriminating the fluid leaks into the closed space S2 in accordance with an air pressure and an outside temperature detected by the operation information acquisition mechanism.

Note that, in the case of the valve V, when the air pressure is changed to open and close the valve V, the pressure inside of the closed space S2 is changed by the vertical move of the piston 43. Therefore, the correction processing unit 63 corrects the predetermined threshold value so that the discrimination processing unit 62 can distinguish the pressure change inside of the closed space S2 by this air pressure or the pressure change inside of the closed space S2 caused by the abnormalities of the valve V and discriminate the abnormalities of the valve V. Specifically, when the air is introduced, the threshold value is corrected to a lower value since the pressure inside of the closed space S2 decreases, and when the air is discharged, the threshold value is corrected to a higher value since the pressure inside of the closed space S2 increases. As a result, the discrimination processing unit 62 can discriminate the pressure change inside of the closed space S2 caused by the abnormalities of the valve V, such as the fluid leaks and the like, regardless of the pressure change inside of the closed space S2 due to the air pressure change.

If the driving pressure sensor is used as the operation information acquisition mechanism, the pressure change inside of the closed space caused by the fluid leaks can be discriminated even during the opening and closing operation of the valve V. In other words, by experimentally finding a suitable transfer function for converting the driving pressure to a required corrected value, it is possible to correct a transient pressure change in the closed space S2 at a moment when the piston 43 is moving.

At the same time, if the detected value of the pressure sensor P does not increase even though a pressure increase in the closed space S2 is expected from the detected value of the driving pressure sensor, it is possible to determine a failure of the piston 43 or the pressure sensor P.

Further, the pressure in the closed space S2 changes depending on the external temperature. Therefore, the correction processing unit 63 corrects the predetermined threshold value so that the discrimination processing unit 62 can distinguish the pressure change in the closed space S2 by this external temperature from the pressure change in the closed space S2 caused by the abnormalities of the valve V to discriminate the abnormalities of the valve V. Specifically, the threshold value is corrected to a high value as the external temperature rises, and the threshold value is corrected to a low value as the external temperature falls. As a result, the discrimination processing unit 62 can discriminate the pressure change in the closed space S2 caused by the abnormalities of the valve V such as the fluid leaks and the like regardless of the pressure change in the closed space S2 due to the change in the external temperature.

The communication processing unit 64 is a functional unit executing data transmission and reception with the fluid control devices A. The communication methods are not particularly limited, but the valve V according to the present embodiment is connected through the connector 53, and the operation information is received from the connected valve V.

The information that the external terminal 6 receives from the fluid control devices A is provided to a terminal used by an administrator or a supervisor in response to a request from the terminal used by the supervisor and the like.

In the present embodiment, the external terminal 6 directly communicates with the fluid control devices A, but the present embodiment is not limited to this, and the communication can also be performed via a relay device that appropriately relays the transmission and reception of data.

According to the above operation analysis system, since each fluid control devices A has self-identification information, the fluid control devices A can be individually identified and its operating condition can be diagnosed without removing it from the lines in the fluid controller G where many fluid control devices A are densely integrated. Further, in addition to analyzing the operation information for each of the fluid control devices A, it is possible to precisely monitor entire lines.

Furthermore, since the operation information of the fluid control devices A is collected to the external terminal 6, the supervisor and the like of the fluid control devices A can monitor the operation status of the fluid control devices A without burden.

Further, regarding the valve V, since the pressure in the closed space S2 is detected and the predetermined threshold value is compared with the detected value to detect the abnormalities, it can be detected even if an abnormality that causes negative pressure in the closed space S2 occurs.

It should be noted that the analysis of the operation of the entire lines contributes to the precise monitoring of the fluid supply lines L1, L2, L3, because, for example, for a plurality of the fluid control devices A configuring the fluid supply line L1, even if an opening/closing operation is executed for a part of the fluid control devices A and opening/closing operations are not executed for a remaining fluid control devices A, the remaining fluid control devices A are affected by the opening/closing operations by the part of the fluid control devices A.

Further, the analysis result of the operation information of the entire lines can be used, for example, for data mining to discriminate the presence or absence of the abnormalities and to anticipate the abnormalities in the fluid supply lines L1, L2, L3. Specifically, since it is possible to grasp an operation time of the fluid control devices Ain the entire lines, a number of times opening/closing operations was actually performed by a predetermined fluid control device A, and a time affected by opening/closing operations of other fluid control devices A, it is possible to determine a timing of maintenance and parts replacement based on the operating time of the entire line, and it is possible to compare opening/closing speeds of each fluid control devices A on the same lines to detect abnormalities.

Figure 9:
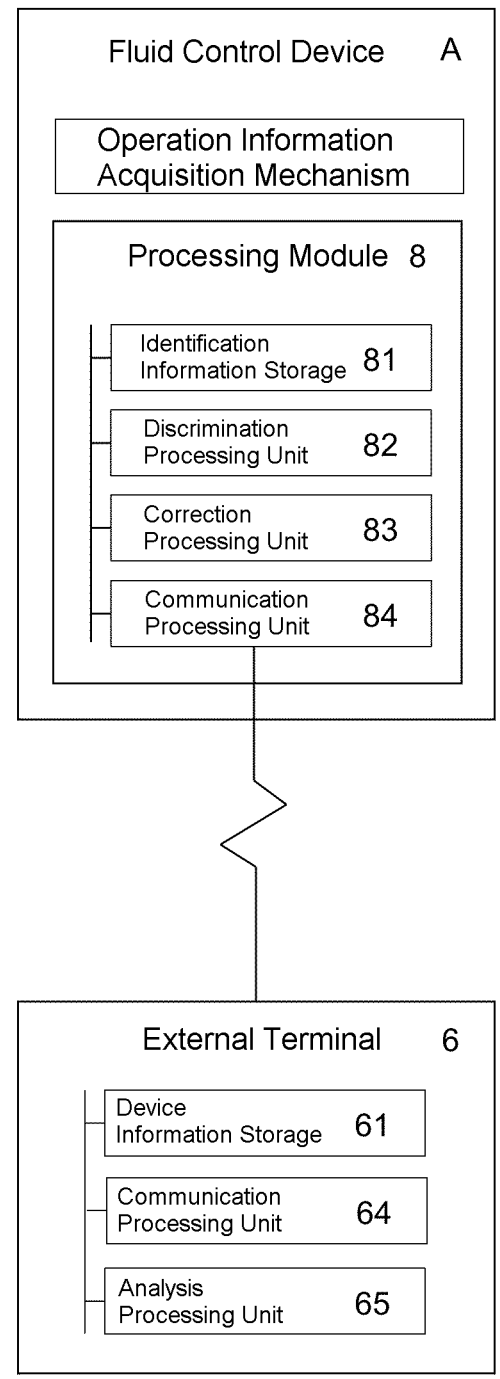
FIG. 9 is a functional block diagram illustrating functions of an external terminal and a fluid control device constituting a fluid controller according to the present embodiment.

In another example, as illustrated in FIG. 9, the fluid control device A can execute an abnormality detection, results for abnormality discriminations can be collected to the external terminal 6, and the operation analysis can be performed based on the results.

In other words, the processing module 8 included in the fluid control device A has the functional unit including an identification information storage 81, a discrimination processing unit 82, a correction processing unit 83, and a communication processing unit 84, and each of these is the function unit having the same functions as the identification information storage 71, the discrimination processing unit 62, the correction processing unit 63, and the communication processing unit 74 described above.

On the other hand, the external terminal 6 includes the device information storage 61, the communication processing unit 64, and an analysis processing unit 65.

Similar to the above mentioned discrimination processing unit 62 and the correction processing unit 63, the discrimination processing unit 82 and the correction processing unit 83 determines whether there are abnormalities based on the operation information acquired from the operation information acquisition mechanism and transmit the self-identification information with the discrimination result to the external terminal 6. The fluid control devices A can transmit not only the discrimination result of the abnormalities but also the operation information to the external terminal 6.

The external terminal 6 receiving this can identify the fluid control device A and grasp the discrimination result of the presence or absence of the abnormalities based on the self-identification information. Further, the analysis processing unit 65 refers to the self-identification information of each of the fluid control devices A stored in the device information storage 61 and analyzes operations of the fluid supply lines L1, L2, L3 or the fluid controller G as a unit based on the discrimination result and the operation information received from each of the fluid control devices A.

In the above embodiment, the fluid control devices A may have a means for issuing a warning when the abnormality of the fluid control devices A is discriminated. Specifically, for example, it can be configured with a visible lamp and the like. This point is same for other embodiments described later.

In addition, as the operation information acquisition mechanism, a temperature sensor (not shown in figures), a limit switch (not shown in figures) and the like can be installed. The temperature sensor, for example, is a sensor to measure a temperature of the fluid, and by installing in a vicinity of the flow path and measuring the temperature of the location, the temperature of the installed location can be regarded as the temperature of the fluid flowing in the flow path. In addition, in a case of the valve V, for example, the limit switch is fixed in a vicinity of the piston 43 and the switch is switched in accordance of the vertical move of the piston 43. As a result, it is possible to detect a number of opening/closing times, a frequency of the opening/closing, and a speed of the opening/closing of the valve V.

Further, an installing position of the operation information acquisition mechanism is not limited, and it is possible to be installed outside of the fluid control devices A, such as on a driving pressure supply path or on an electric wire, in consideration of its function.

In addition, in the above embodiment, the valve V configuring the same fluid supply lines L1, L2, L3 and the flow rate controller F are connected to be able to transmit and receive information, and the information acquired from the operation information acquisition mechanism in the valve V constituting the same fluid supply lines L1, L2, L3, can be collected to the flow rate controller F and can be transmitted with the operation information of the flow rate controller F to a predetermined information processing device provided outside of the lines.

Further, the external terminal 6 not only may be connected to a sensor or an arithmetic unit to collect the operation information of the flow rate controller F but also may control each of the fluid control devices A by actively send a predetermined instruction signal.

In the above described embodiment, the fluid controller G has three fluid supply lines L1, L2, L3, but an application of the present invention is not limited to a number of lines.

Further, the embodiments of the present invention is not limited to the above-described embodiments, and those skilled in the art can change or add various configurations, means, or functions within a range not departing from a scope of the present invention.

REFERENCE SIGNS LIST 1 valve body
  11 base
  12 cylindrical part
2 bonnet part
  21 seat
  22 diaphragm
  23 diaphragm retainer
  24 bonnet
  25 bonnet wall
3 cover part
  31 cover
  32 plate
  33 plate
4 actuator part
  41 actuator body
  42 actuator cap
  43 piston
  44 spring
51 flexible cable
52 circuit board
53 connector
6 external terminal
  61 device information storage
  62 discrimination processing unit
  63 correction processing unit
  64 communication processing unit
  65 analysis processing unit
7 processing module
  71 identification information storage
  72 communication processing unit
8 processing module
  81 identification information storage
  82 discrimination processing unit
  83 correction processing unit
  84 communication processing unit
A fluid control device
F(F1, F2, F3) flow rate controller(s)
G fluid controller
L1, L2, L3 fluid supply lines
V(V11-V14, V21-24, V31-34) valve(s).

The invention claimed is:

1. A fluid controller, comprising a plurality of fluid supply lines, each comprising a respective plurality of control devices connected to one another in a manner forming a route for a fluid, two or more of the fluid control devices being valves, each configured to switch, responsive to a respective opening-closing actuating control, between an open position and a closed position, and one of the fluid control devices comprising a respective flow rate controller, and the fluid controller further comprises:
    an external terminal, comprising a terminal-based communication means, and configured to selectively perform a diagnosing process;
    arranged with each valve in each of the fluid supply lines
      an operation information acquisition mechanism comprising a plurality of sensors configured to acquire an operation information in the valve, the operation information including:
        a state of the respective opening-closing actuating control received by the valve,
        an open-close position of the valve, and
        an affecting data indicating a measurement of a flow into the valve and/or measurement of a pressure within the valve, the measurements being sufficient for an analysis process to quantify an affecting of the flow and the pressure caused by movements by another of the valves in the fluid supply line;
    an identification information storage means that includes a device information storage arranged in each of the fluid control devices, storing a self-identification information for the fluid control device; and a communication processing means configured to transmit to the external terminal the operation information acquired in each valve in each of the fluid supply lines, the transmissions including the self-identification information of the valves, and being at different timings for each of the valves, wherein the diagnosing process is configurable for a selectable subject valve among the valves in a subject one of the fluid supply lines, and is configured to:

cause a diagnosing mode movement of the subject valve, the diagnosing mode movement being configured to affect a flow into and/or a pressure in a related other valve in the subject fluid supply line, request the respective operation information acquisition mechanism of the related other valve to acquire an update of the related other valve's operation information and to transmit the update to the external terminal, and discriminate, based at least in part on the update of the related other valve's operation information, in combination with the identification information of the related other valve, a condition of the subject valve.

2. The fluid controller according to claim 1, wherein one or more of the valves further include a respective discrimination processing means configured to discriminate one or more kinds of abnormalities of the valve, based at least in part on the valve's operation information, and a leakage abnormality is among the one or more kinds, and the communication processing means is further configured to transmit to the external terminal instances of the valve's discrimination processing means positively discriminating the abnormalities of the valve and to include the self-identification information of the valve, at different timings for each of the valves.

3. The fluid controller according to claim 2, wherein the communication processing means is further configured to transmit with the instances of positive discrimination, the operation information of the on which the positive discrimination of the abnormalities was based.

4. The fluid controller according to claim 2, wherein the communication processing means is further configured to transmit to the external terminal the instances of positive discrimination and the corresponding operation information of the valves at a predetermined cycle.

5. The fluid controller according to claim 2, wherein at least one of the valves further comprises an abnormality warning lamp, arranged to be visible when activated and, corresponding to the abnormality lamp, a means for activating the abnormality warning lamp in response to the instances of the valve's discrimination processing means positively discriminating the abnormalities.

6. The fluid controller according to claim 1, wherein:

the external terminal further comprises a terminal-based discrimination processing unit means that is configured to perform, responsive to receiving the operation information from the information acquisition mechanism of a valve, along with the valve's identification information, a discrimination of one or more kinds of abnormalities of the valve, a leakage abnormality being among the one or more kinds.

7. The fluid controller according to claim 6, wherein:

the valve further comprises an abnormality warning lamp, arranged to be visible when activated;

the terminal-based communication processing means is further configured to transmit to the valve an indication of an instance of positively discriminating the abnormality; and the valve is further configured to activate the abnormality warning lamp in response to receiving the transmitted indication of the instance of positively discriminating the abnormality of the valve.

8. The fluid controller according to claim 1, wherein the external terminal is further configured to perform a fluid supply line analysis process, comprising performing the diagnosing process for each valve in the subject fluid supply line.

9. The fluid controller according to claim 8, wherein the external terminal is further configured to perform a fluid controller analysis process, comprising performing, for each of the fluid supply lines, the fluid supply line analysis.

* * * * *